(12) United States Patent
Yoon et al.

(10) Patent No.: US 12,738,094 B2
(45) Date of Patent: Sep. 15, 2026

(54) FACIAL RECOGNITION METHOD AND APPARATUS BASED ON MASKING

(71) Applicant: ELECTRONICS AND TELECOMMUNICATIONS RESEARCH INSTITUTE, Daejeon (KR)

(72) Inventors: Ho-Sub Yoon, Daejeon (KR); Jae-Hong Kim, Daejeon (KR); Jae-Yoon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 289 days.

(21) Appl. No.: 18/434,093

(22) Filed: Feb. 6, 2024

(65) Prior Publication Data

US 2025/0069432 A1 Feb. 27, 2025

(30) Foreign Application Priority Data

Aug. 25, 2023 (KR) ........................ 10-2023-0111822

(51) Int. Cl.
*G06V 40/16* (2022.01)

(52) U.S. Cl.
CPC .......... *G06V 40/172* (2022.01); *G06V 40/171* (2022.01)

(58) Field of Classification Search
CPC .... G06V 40/172; G06V 40/171; G06V 10/75; G06V 10/761; G06F 16/51
USPC .................................................. 382/100, 118
See application file for complete search history.

(56) References Cited

U.S. PATENT DOCUMENTS 10,635,890 B2 4/2020 Yan et al.
10,984,225 B1 * 4/2021 Ghosh .................. G06V 40/161
12,026,921 B2 * 7/2024 Oquab .................... G06T 9/001
2015/0165365 A1 * 6/2015 Menke ............... F02M 25/0854 96/108
2019/0332851 A1 * 10/2019 Han .................... G06V 40/166
2020/0167583 A1 5/2020 Yoon et al.
(Continued)

FOREIGN PATENT DOCUMENTS

KR 10-2005-0096484 A 10/2005
KR 10-2019-0016733 A 2/2019
(Continued)

OTHER PUBLICATIONS

Yingcheng Su et al., "Face Recognition with Occlusion", 2015 3rd IAPR Asian Conference on Pattern Recognition, Nov. 3, 2015, p. 670-674.

(Continued)

*Primary Examiner* — Sheela C Chawan
(74) *Attorney, Agent, or Firm* — Sughrue Mion, PLLC

(57) ABSTRACT

Disclosed herein are a facial recognition method and apparatus based on masking. The facial recognition method based on masking includes performing detection and normalization of a face area including five landmarks in an input image, separating a face portion other than a portion covered by an obstacle in the detected face area, generating a mask corresponding to the separated face portion when there is a portion covered by an obstacle in the separated face portion, applying the mask to an image in a face image registration database and extracting a feature of a masking region, and determining whether it is an identical person based on the extracted feature value.

14 Claims, 13 Drawing Sheets

(56) References Cited

U.S. PATENT DOCUMENTS

| | | | | |
|---|---|---|---|---|
| 2022/0044009 | A1* | 2/2022 | Han | G06F 18/25 |
| 2022/0100989 | A1* | 3/2022 | Zhu | G06F 21/602 |
| 2022/0129689 | A1 | 4/2022 | Kim et al. | |
| 2022/0180101 | A1* | 6/2022 | Rai | G06N 3/045 |
| 2022/0300591 | A1* | 9/2022 | Kim | G06V 10/774 |
| 2022/0327861 | A1* | 10/2022 | Yang | G06V 40/161 |
| 2023/0135400 | A1* | 5/2023 | Zhai | G06V 40/171 382/118 |

FOREIGN PATENT DOCUMENTS

| | | | |
|---|---|---|---|
| KR | 10-2022-0008242 | A | 1/2022 |
| KR | 10-2022-0043842 | A | 4/2022 |
| KR | 20220043842 | * | 4/2022 |

OTHER PUBLICATIONS

Lingxue Song et al., "Occlusion Robust Face Recognition Based on Mask Learning With Pairwise Differential Siamese Network", 2019 IEEE/CVF International Conference on Computer Vision (ICCV), Oct. 27, 2019, p. 773-782.

* cited by examiner

FACIAL RECOGNITION METHOD AND APPARATUS BASED ON MASKING

CROSS REFERENCE TO RELATED APPLICATION

This application claims the benefit of Korean Patent Application No. 10-2023-0111822, filed Aug. 25, 2023, which is hereby incorporated by reference in its entirety into this application.

BACKGROUND OF THE INVENTION

1. Technical Field

The present disclosure relates to a facial recognition technology that is robust to being covered by an obstacle.

More particularly, the present disclosure relates to technology to perform facial recognition based on similarity to a portion other than a covered portion.

2. Description of the Related Art

In camera based facial recognition, low accuracy or error in identity recognition often occurs due to various problems. Wrong identity recognition may matter in simple immigration control or attendance management, yet an incorrect recognition result during payment through facial recognition may also be a big burden on the manager and may make it difficult to use the facial recognition system.

Furthermore, as it is commonplace for normal people to use masks due to infectious diseases such as the recent corona virus, accuracy in facial recognition is reduced, so even the use of an existing system that used to be used is being discontinued or when a facial recognition system is used, it is being operated by forcing the mask to be taken off.

To solve this problem, various solutions have been tried, and in order to increase recognition performance without taking off the mask, a method by which a system itself determines whether a mask is worn, extract features from a registered image and an input face which is limited to a face portion other than some of the masked region and compare similarity between the features or a method by which the system composes an input mask on the registered face and perform similarity comparison has been suggested. The method aims to increase reliability of similarity measurements to the maximum by extracting the feature values after transforming the registered image to have a similar environment to the input face image with a mask worn as much as possible.

However, the method has a downside that the system has to first accurately distinguish whether a mask is worn, and efficiency depends on where and how accurately the portion covered by the mask is found. Furthermore, whenever various types of face covering occur not only by a mask but also by many different things such as a hat, a scarf, sunglasses, fingers, a camera, etc., what part is covered and how much it is covered need to be determined accurately, in which case accurately distinguishing every type of covered portion that occurs in real life is a very difficult job even when a traditional deep learning method is used.

Hence, the present disclosure proposes a method of detecting a face portion that remains without being covered and measuring similarity with a registered face based on the detection instead of paying attention to the covered area.

With this method of measuring the similarity, both the existing methods of finding a currently input covered portion in the registered image, excluding the portion and extracting a feature therefrom and of adding the covered portion and extracting a feature therefrom do not solve a problem that features are extracted differently for the same person depending on a change in hair style of the input face, but the present disclosure has recognition performance that is more robust to the changes in hair style because an uncovered masking region from which to extract a feature does not include the hair area.

PRIOR ART DOCUMENTS

Patent Documents (Patent Document 1) Korean Patent Application Publication No. 2022-0043842 (Title: edge device and system for recognizing face worn with mask)

SUMMARY OF THE INVENTION

Accordingly, the present disclosure has been made keeping in mind the above problems occurring in the prior art, and an object of the present disclosure is to provide a method of recognizing a face that is robust to an occasion when the face is covered by an obstacle.

Another object of the present disclosure is to increase reliability of facial recognition based on similarity comparison by excluding a covered area and using only a detected face portion.

In accordance with an aspect of the present disclosure to accomplish the above objects, there is provided a method of face recognition based on masking, including performing detection and normalization of a face area including five landmarks in an input image; separating a face portion other than a portion covered by an obstacle in the detected face area; generating a mask corresponding to the separated face portion when there is a portion covered by an obstacle in the separated face portion; applying the mask to an image in a face image registration database and extracting a feature of a masking region; and determining whether it is an identical person based on an extracted feature value.

Generating the mask corresponding to the separated face portion may include determining that there is a covered portion when the face landmark points are not present in the separated face portion or when a size of a detected face element is smaller than a preset size.

The face landmark points may include center positions of both eyes, a center position of nose, and both corner positions of mouth.

Determining whether it is an identical person based on the extracted feature value may include determining whether it is an identical person by using the feature value of the masking region and a feature value of an original registered image.

Determining whether it is an identical person based on the extracted feature value may include calculating a weighted sum of the feature value of the masking region and the feature value of the original registered image based on a proportion of the portion covered by the obstacle in a whole face.

The face image registration database may store a face image and a feature value corresponding to the face image.

The facial recognition method may further include determining whether it is an identical person by comparing a feature value extracted from an image in the face image registration database with a feature value extracted from the input image when there is no portion covered by an obstacle in the separated face portion.

In accordance with another aspect of the present disclosure to accomplish the above objects, there is provided a facial recognition apparatus based on masking, including memory configured to store at least one program; and a processor configured to execute the program, wherein the program includes instructions to perform performing detection and normalization of a face area including five landmarks in an input image; separating a face portion other than a portion covered by an obstacle in the normalized face area; generating a mask corresponding to the separated face portion when there is a portion covered by an obstacle in the separated face portion; applying the mask to an image in a face image registration database and extracting a feature of a masking region; and determining whether it is an identical person based on an extracted feature value.

Generating the mask corresponding to the separated face portion may include determining that there is a covered portion when the face landmark points are not present in the separated face portion or when a size of a detected face element is smaller than a preset size.

The face landmark points may include center positions of both eyes, a center position of nose, and both corner positions of mouth.

Determining whether it is an identical person based on the extracted feature value may include determining whether it is an identical person by using the feature value of the masking region and a feature value of an original registered image.

Determining whether it is an identical person based on the extracted feature value may include calculating a weighted sum of the feature value of the masking region and the feature value of the original registered image based on a proportion of the portion covered by the obstacle in a whole face.

The face image registration database may store a face image and a feature value corresponding to the face image.

The program may be configured to determine whether it is an identical person by comparing a feature value extracted from an image in the face image registration database with a feature value extracted from the input image when there is no portion covered by an obstacle in the separated face portion.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
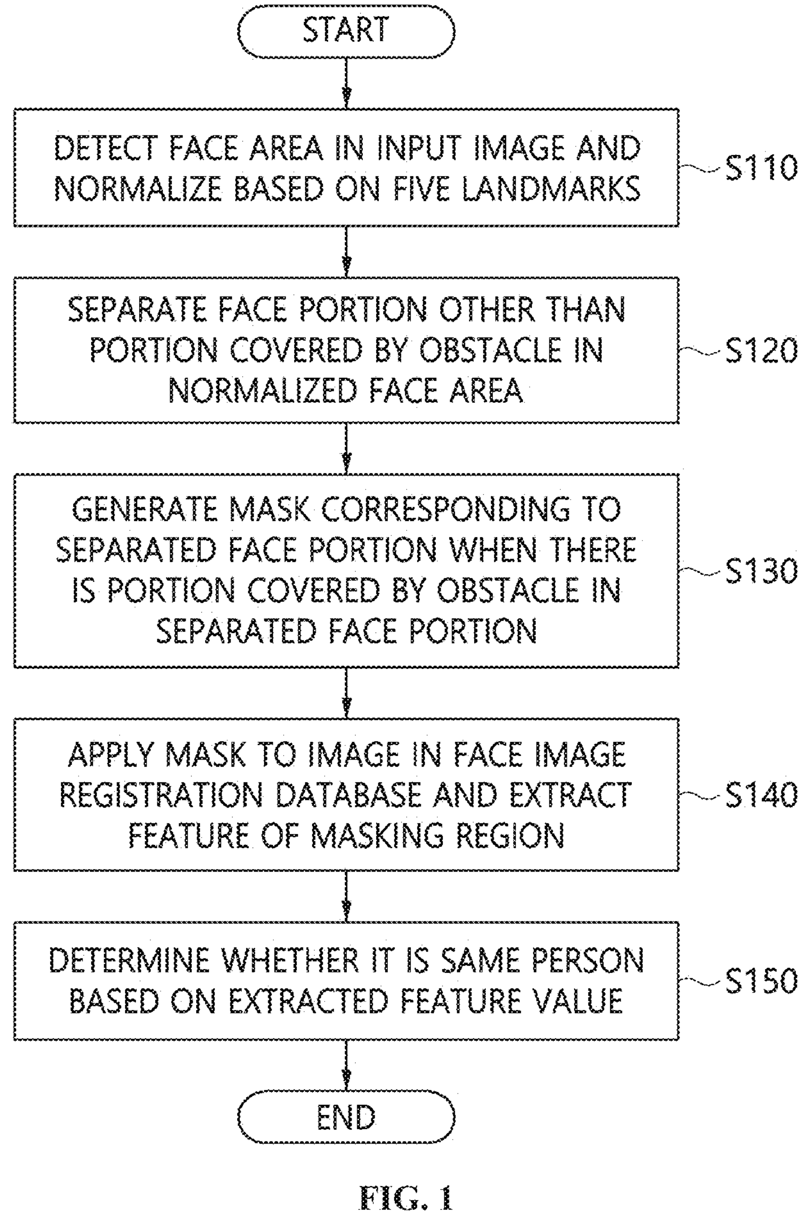
FIG. 1 is a flowchart illustrating a facial recognition method based on masking, according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will now be described in detail with reference to the accompanying drawings, identical reference numerals are assigned to indicate identical or similar elements in descriptions made with reference to the drawings, and overlapping descriptions will be omitted.

FIG. 1 is a flowchart illustrating a facial recognition method based on masking, according to an embodiment of the present disclosure.

The facial recognition method based on masking may be performed in a facial recognition device such as a computing device or a server.

Referring to FIG. 1, the facial recognition method based on masking includes step S110 of performing detection and normalization of a face area including five landmarks in an input image, step S120 of separating a face portion other than a portion covered by an obstacle in the detected face area, step S130 of generating a mask corresponding to the separated face portion when there is a portion covered by an obstacle in the separated face portion, step S140 of applying the generated mask to an image in a face image registration database (DB) and extracting a feature of a masking region, and step S150 of determining whether it is the same person based on the extracted feature value.

Step S140 of extracting the feature of the masking region may include extracting a feature only in the masking region other than the other area.

Step S130 of generating the mask corresponding to the separated face portion may include determining that there is a covered portion when the face landmark point is not present in the separated face portion or when area sizes of detected face elements are smaller than a preset size.

The face landmark points may include center positions of both eyes, a center position of nose, and both corner positions of mouth.

The face landmark point may be equal to or greater than 68 or 98.

When the face is determined as being covered according to face parsing or face landmark points, only an uncovered face portion may be obtained by applying a face segmentation method and the uncovered face portion may be designated as a masking region. Step S150 of determining whether it is the same person based on the extracted feature value may include determining whether it is the same person by using a feature value of the masking region and a feature value of an original registered image.

Step S150 of determining whether it is the same person based on the extracted feature value may include calculating a weighted sum of the feature value of the masking region and the feature value of the original registered image based on a proportion of the portion covered by the obstacle in the whole face.

The face image registration database may store a face image and a feature value corresponding to the face image.

The method may further include determining whether it is the same person by comparing a feature value extracted from an image in the face image registration database with a feature value extracted from the input image when there is no portion covered by an obstacle in the separated face portion.

Figure 2:
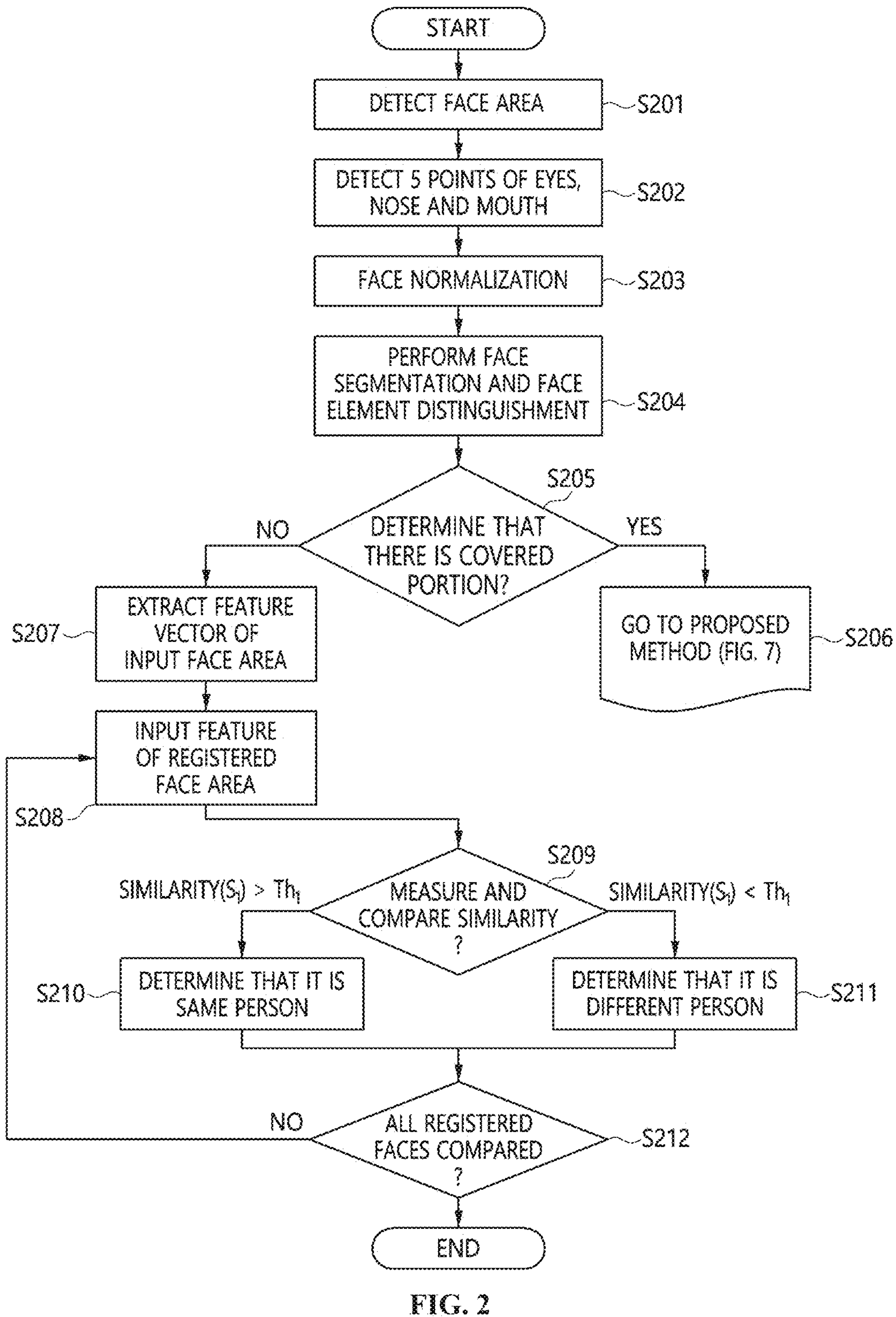
FIG. 2 is a flowchart illustrating a facial recognition method in detail, according to an embodiment of the present disclosure.

FIG. 2 is a flowchart illustrating a facial recognition method in detail, according to an embodiment of the present disclosure.

Referring to FIG. 2, in the method, when a face image is input from a camera, facial recognition is performed at steps S201 to S211. Especially, the method is characterized by having steps S204 to S206.

The existing facial recognition system undergoes a face detection step S201 that uses deep learning. With the advancement of deep learning technologies, various algorithms such as CNN cascade, R-FCN, FaceNess, FCNet, RetinaFace, TinaFace, etc., have been developed and are still being developed to increase accuracy of face detection. To explain the present disclosure, the face detection step will now be described by focusing on the RetinaFace model, but the present disclosure is not limited thereto.

Figure 3:
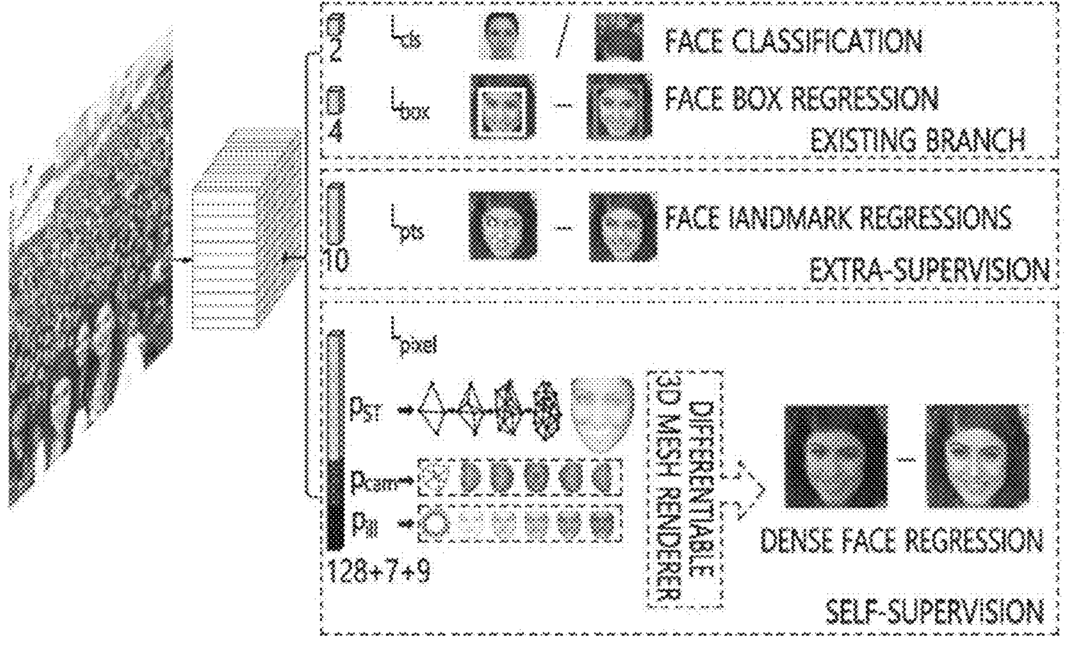
FIG. 3 illustrates an example of RetinFace outputs.

FIG. 3 illustrates an example of RetinFace outputs. In FIG. 3, $L_{box}$ indicates a minimum bounding box of a face, and $L_{pts}$ indicates eye center points, a nose center point, and mouth corner points.

Once a face of the user is detected, normalization is performed to compensate for a change in face size and angle at the next step. Reference position points for normalization in the detected face are required to perform normalization, and in the case of RetinaFace, outputs of five points such as center positions of both eyes, a center position of nose, and both corner positions of mouth as shown in FIG. 3 are provided as the reference position points.

Figure 4:
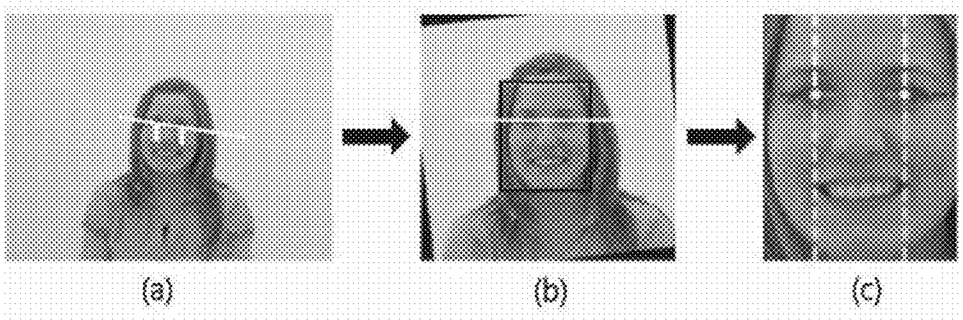
FIG. 4 illustrates an example of face alignment using eye points.

FIG. 4 illustrates an example of face alignment using eye points.

When a face is detected, face normalization is performed to compensate for size and rotation of the face at step S203. In the face normalization step, the five points detected in the face are set as reference points, enlarged or reduced to a set size, or the rotated face is aligned horizontally.

In this regard, many researches on what reference points are to be used to normalize a face have been conducted, but in this specification, face normalization as in FIG. 4 based on the two eye center points detected by RetinaFace as mentioned above will be described as an example. In the present disclosure, the face normalization is a very important function because it will be equally used later to determine a position of a mask to be applied to the face image registration database.

When the face is normalized at step S203, the existing facial recognition system directly performs step S207. After a feature vector is extracted from the detected and normalized image by using a proper deep learning model even when there are various types of covered portions in the input image, feature vectors of images registered in the database are received as inputs at step S208, and similarity between two feature vectors are compared at step S209.

In this case, a similarity value is obtained by calculating a distance value between feature vectors obtained from the input image and feature vectors obtained from the registered image usually in various methods such as Euclidean, Mahalanobis, or cosine distance calculation method. In the present disclosure, the similarity calculated in the cosine distance method is used as similarity $S_1$ of FIG. 2, but the present disclosure is not limited thereto. Furthermore, in the present disclosure, a vision transformer (ViT) model is used as the deep learning model to extract a feature vector, the present disclosure is not limited thereto.

After the similarity value $S_1$ is calculated, the value is subject to step S209 of comparing whether the value is equal to or greater than a certain value or threshold $Th_1$. A proper value may be selected as the value $Th_1$ depending on application of the facial recognition, an environment, camera status, lighting, etc.

The comparing between the value $S_1$ and the value $Th_1$ may lead to performing step S210 of determining that persons in the input image and the registered image are the same person when the similarity is greater than the threshold and step S211 of determining that the persons are different when the similarity is less than the threshold. When there is a registered face feature vector left after step S212 of determining whether comparison of similarity between all registered images is completed, steps S208 to S213 are repeated, and when there is no more registered image to be compared, the process is terminated.

The facial recognition flowchart of a method according to an embodiment of the present disclosure will now be described in more detail. The method according to the embodiment of the present disclosure newly undergoes step S204 to S206 in addition to the existing steps of the facial recognition system.

Figure 5:
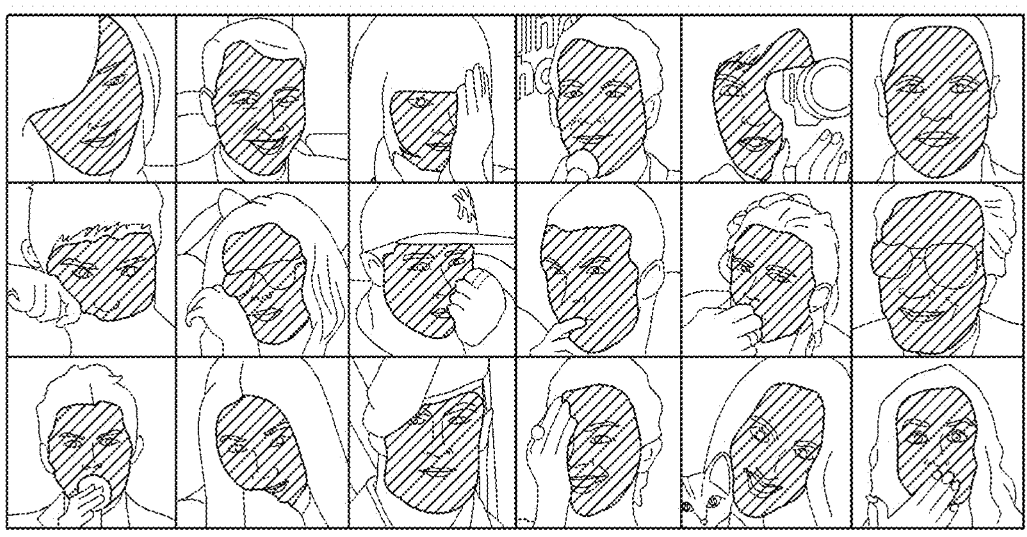
FIG. 5 illustrates an example of face segmentation results.

FIG. 5 illustrates an example of face segmentation results.

Figure 6:
FIG. 6 illustrates an example of results of distinguishing face elements by face parsing.

FIG. 6 illustrates an example of results of distinguishing face elements by face parsing.

At step S204, face segmentation is performed on an aligned face area based on deep learning. The face segmentation is an algorithm for separating only an uncovered face portion as in FIG. 5 when a detected face area is covered by any type of obstacle. Referring to FIG. 5, it may be seen that the face of a person may be covered by various objects such as hair, fingers, a camera, a mask, sunglasses, a microphone, a hat, a handkerchief, etc., and it may be seen that, as a result of face segmentation, only an uncovered face portion is separated as an area marked with slashes.

Furthermore, at step S204, deep learning based face parsing may also be performed, and the face parsing is an algorithm for separating each element (eyes, nose, mouth, eyebrow, ears, skin, etc.) of the face into a separate area and results of the face parsing may be as in FIG. 6.

In the present disclosure, face segmentation and face parsing are not specified, and when an associated new algorithm with good performance is developed later, it may also be applied to the present disclosure.

After completion of face parsing at step S204, whether the face is covered is determined at step S205. Specifically, when the elements (eyes, nose, mouth, eyebrow, and skin) of the face are found to have suitable sizes, the face may be determined as an uncovered face as compared to the normal face, but when even some of the face elements do not have an area that is parsed or are parsed as having a certain size or smaller than a normal size, the face is identified as a covered face. This is simply expressed in an algorithm as in the following table 1.

TABLE 1

```
If (left_eyebrow_region == Not_Exist or left_eyebrow_region <
Th_eyebrow_size)
then Occluded;
If(right_eyebrow_region == Not_Exist or right_eyebrow_region <
Th_eyebrow_size)
then Occluded;
If (left_eye_region == Not_Exist or left_eye_region < Th_eye_size)
then Occluded;
If (right_eye_region == Not_Exist or right_eye_region < Th_eye_size)
then Occluded;
If (nose_region == Not_Exist or nose_region < Th_nose_size)
then Occluded;
If (mouth_region == Not_Exist or mouth_region < Th_mouth_size)
then Occluded;
If (face_skin_region < Th_face_skin_size)
then Occluded;
```

In the algorithm of table 1, whether the face is covered is determined based on whether some face elements are not present or are smaller than a certain size value (Threshold: Th_eyebrow_size, Th_eye_size, Th_nose_size, Th_mouth_size, Th_face_skin_size). The threshold value may be set experimentally or empirically, but is not limited thereto.

When it is determined at step S205 that there is a covered portion in the face, it undergoes step S206.

Figure 7:
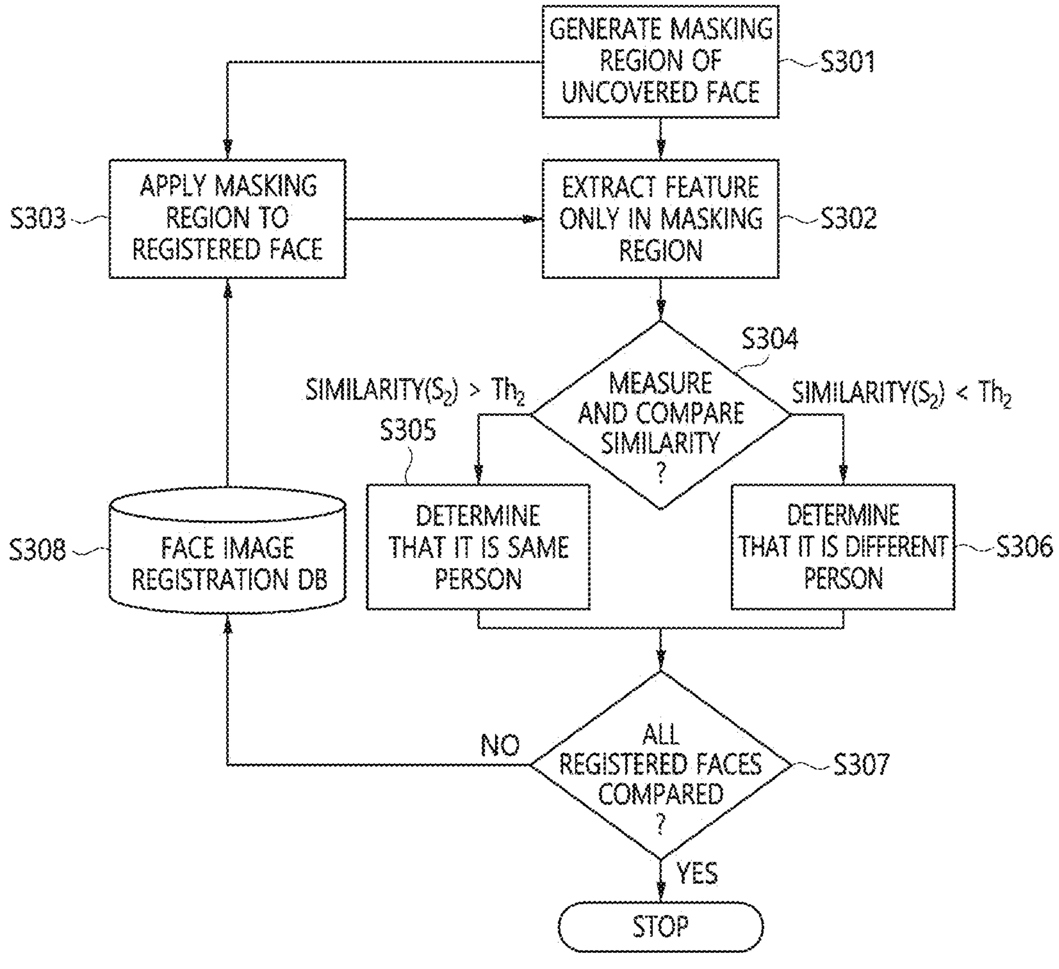
FIG. 7 is a flowchart illustrating a facial recognition step based on determination of having a covered portion.

FIG. 7 is a flowchart illustrating a step of facial recognition based on determination of having a covered portion.

In FIG. 7, steps S301 to S307 are proceeded. Firstly, at step S301, a mask of an uncovered face portion in the currently input face area is generated by using the face segmentation result obtained at step S204.

Figure 8:
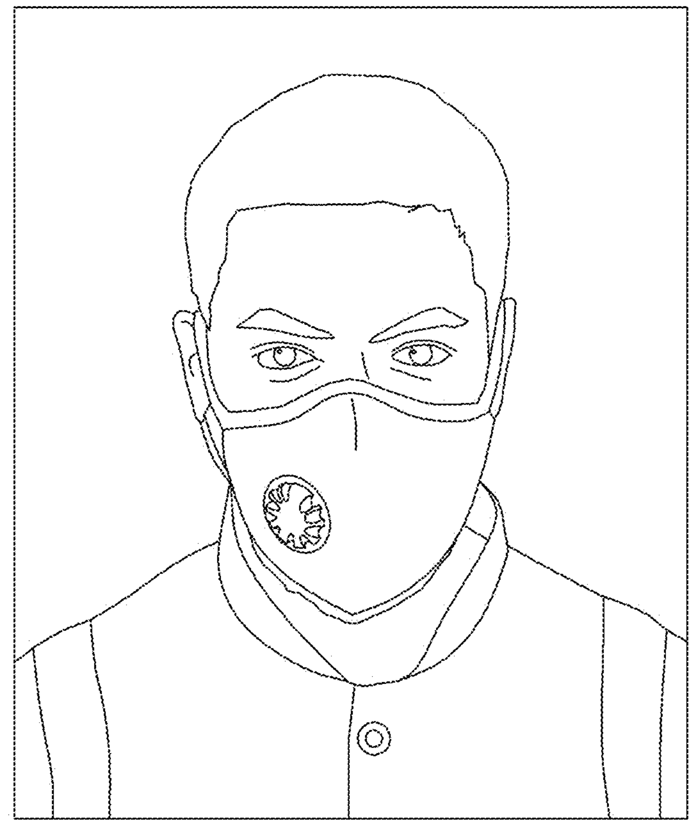
FIG. 8 illustrates an example of a face image covered by a mask for disinfection.

FIG. 8 illustrates an example of a face image covered by a mask for disinfection.

Figure 9:
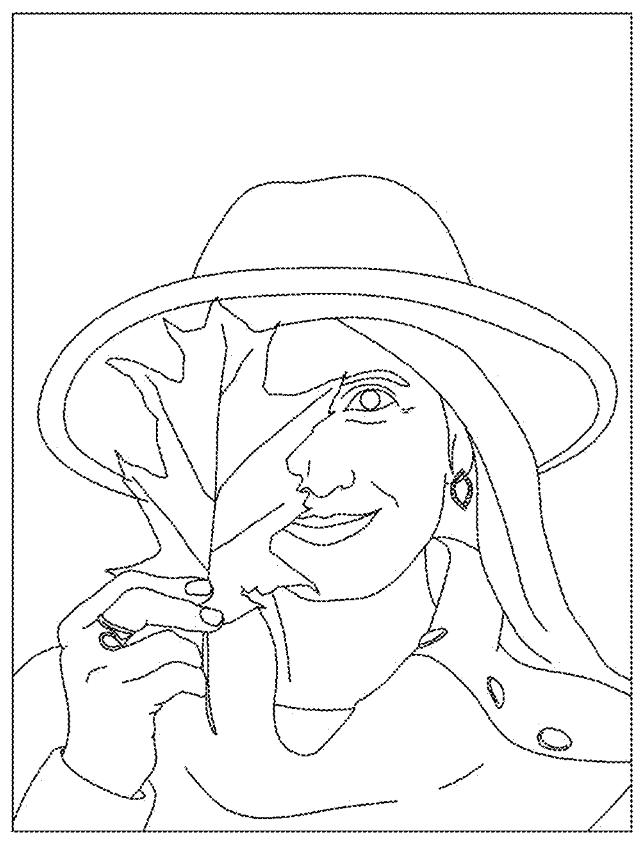
FIG. 9 illustrates an example of a face image covered by a leaf.

FIG. 9 illustrates an example of a face image covered by a leaf.

Figure 10:
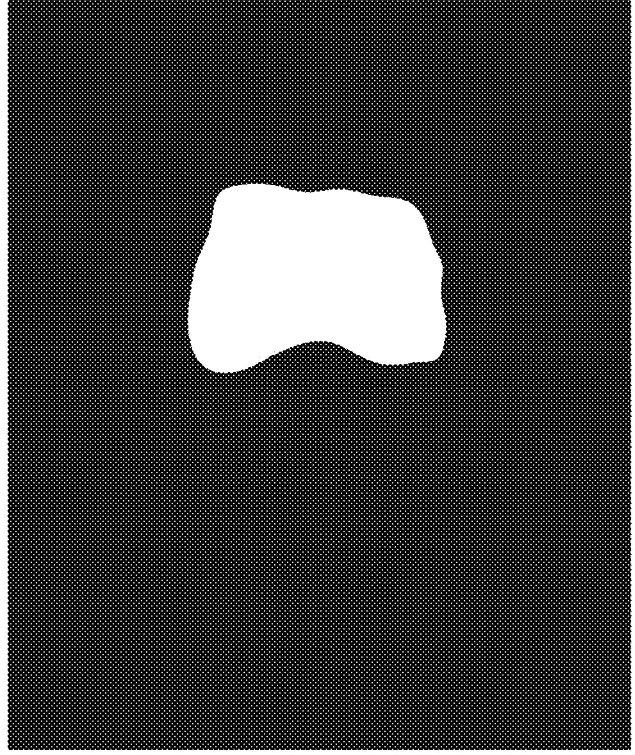
FIGS. 10 and 11 illustrate examples of masking regions generated with uncovered face areas formed by face segmentation.
Figure 11:
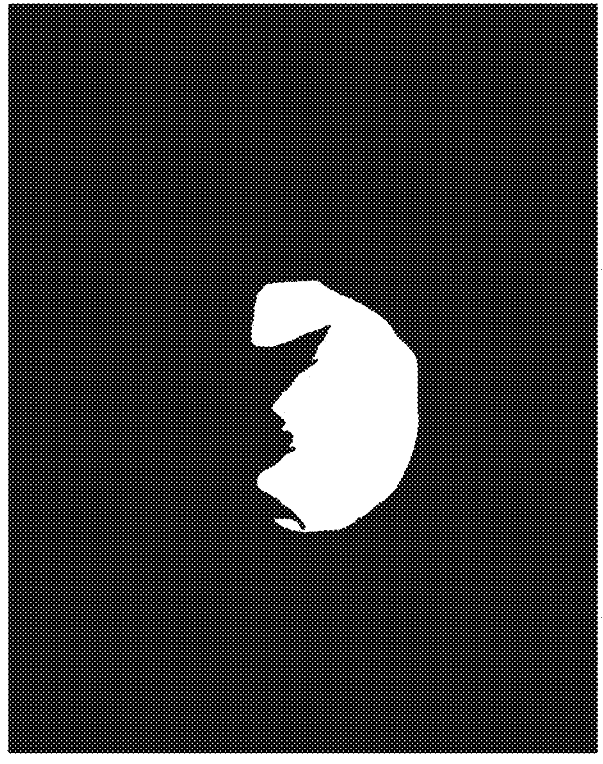

FIGS. 10 and 11 illustrate examples of masking regions tagged with uncovered face areas generated by face segmentation.

When a masking region of an uncovered face is generated at step S301, features are extracted only in the generated masking region for the detected input face area and for a registered face area at step S303 at step S302. At step S304, a similarity distance between a feature vector extracted from the input image and an input vector extracted from the registered image is measured, and the measured similarity distance is designated $S_2$.

The measured value $S_2$ is compared with a threshold $Th_2$ at step S304, and when it is greater than the threshold value, it is determined to be the same person at step S305 and when it is less than the threshold value, it is determined to be a different person at step S306. In this case, like the aforementioned threshold value $Th_1$, the threshold value $Th_2$ may be selected empirically to be a suitable value depending on application of the facial recognition, an environment, camera status, lighting, etc.

Whether all registered faces from the face image registration database were compared is verified at step S307, and when all the faces were compared, the process is terminated and when all the faces were not compared, steps S303 to S308 are repeated.

In this case, to attempt to recognize a covered face in a method according to an embodiment of the present disclosure, it is essential to store not only feature vectors but also actual face images in the face image registration database at step S308. At step S303 next to step S308, the masking region of the face area obtained at step S301 is applied to the registered face images.

Figure 12:
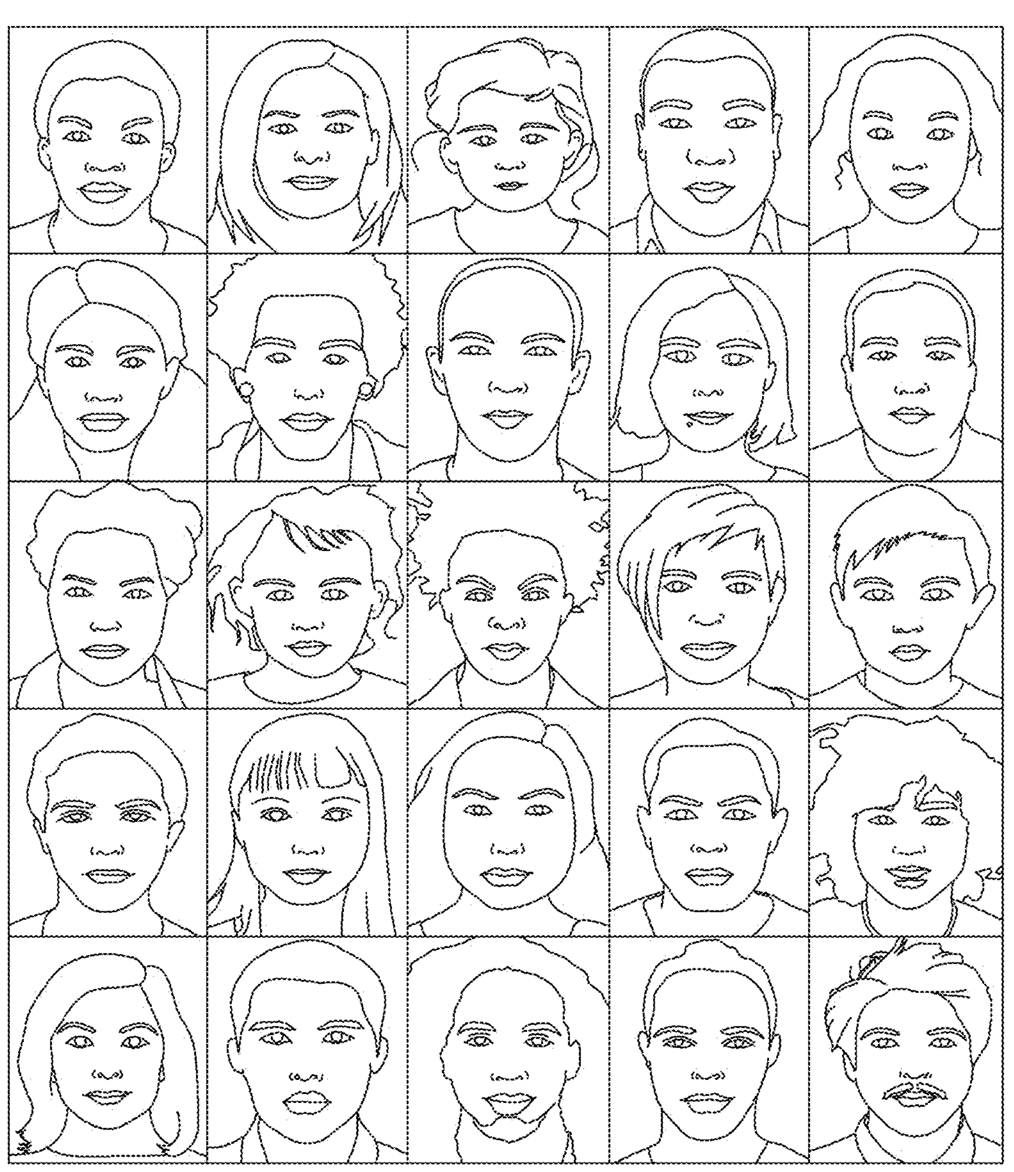
FIG. 12 illustrates an example of original registered face images.

FIG. 12 illustrates an example of original registered face images.

Figure 13:
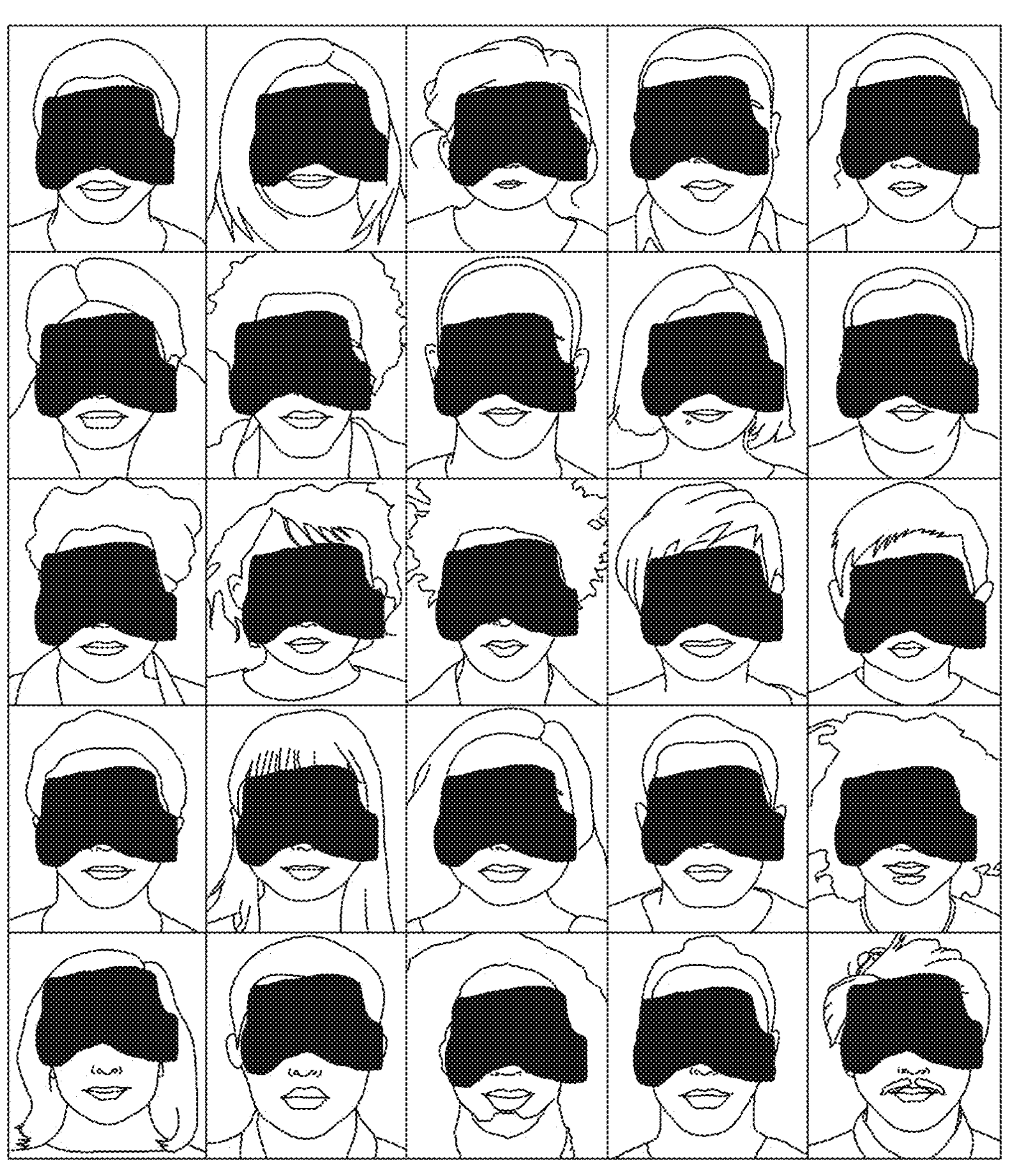
FIG. 13 illustrates an example of original registered face images, to which masking regions are applied.

FIG. 13 illustrates an example of original face images, to which masking regions are applied.

Figure 14:
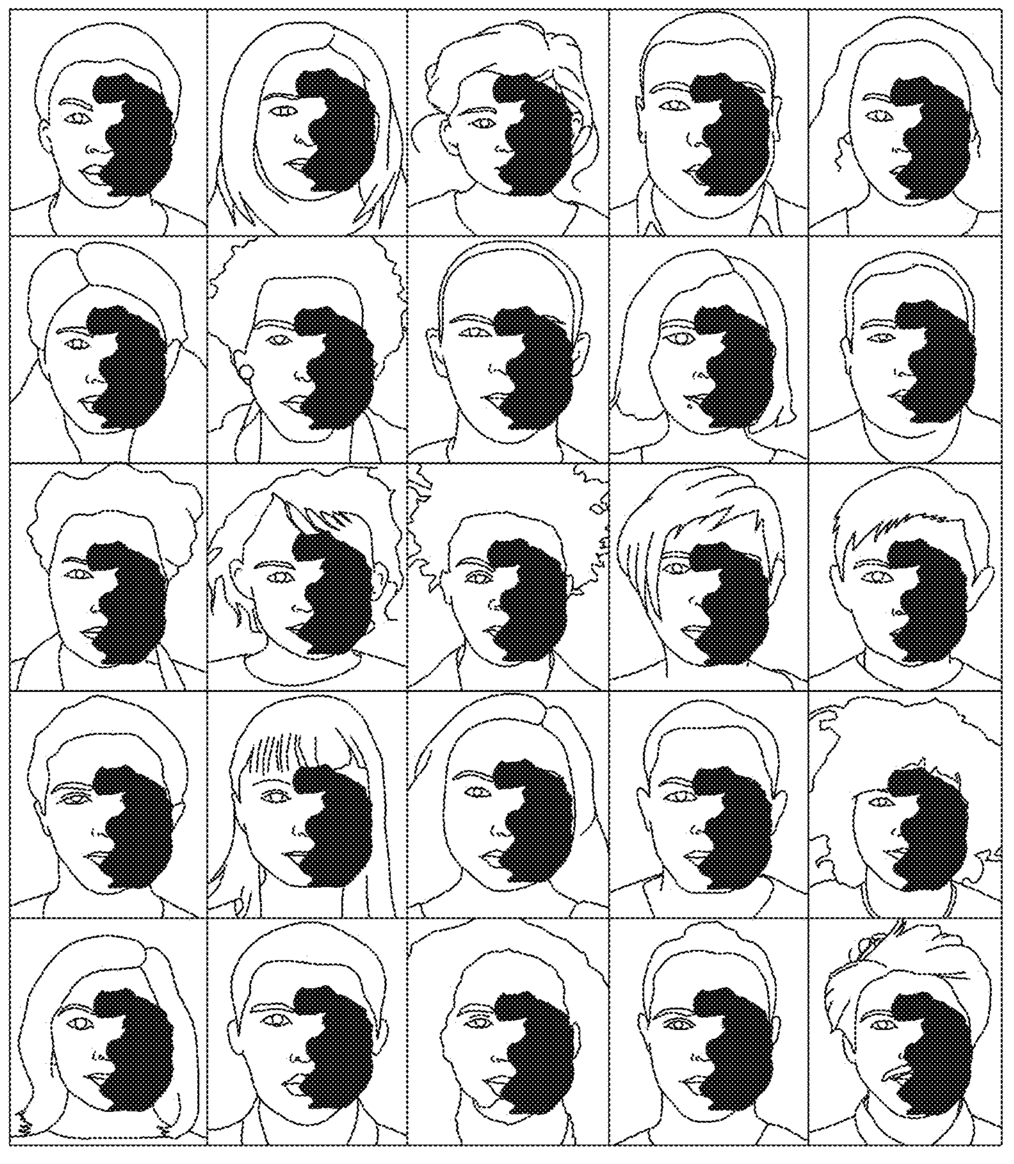
FIG. 14 illustrates another example of original registered face images, to which masking regions are applied.

FIG. 14 illustrates another example of original face images, to which masking regions are applied.

Referring to FIGS. 12 to 14, it is seen that features are extracted not in the whole registered face images as in FIG. 12 but only in masking regions as in FIGS. 13 and 14.

As such, the present disclosure proposes a method by which only an uncovered portion of a face area is extracted as a masking region in an input image, a feature is then extracted only in the same area through masking in a registered image as well and it is determined whether it is the same person or different persons based on similarity $S_2$ between the two feature vectors.

A method of measuring similarity by combining the traditional similarity measurement $S_1$ in a method by which a feature is extracted in a detected face area no matter whether a covered face is input and similarity comparison is performed and the similarity measurement $S_2$ according to an embodiment of the present disclosure may also be used. The combination of the traditional method and the method according to an embodiment of the present disclosure may be expressed as in the following Equations (1) to (3):

$$\text{Weight}_1 + \text{Weight}_2 = 1.0 \tag{1}$$

$$\text{Weight}_2 = 1.0 - (\text{Masking\_region}/\text{Face\_area}) \tag{2}$$

$$\text{Similarity}_{total} = S_1 * \text{Weight}_1 + S_2 * \text{weight}_2 \tag{3}$$

A similarity measurement obtained by combining the aforementioned first similarity value $S_1$ and the second similarity value $S_2$ may be defined as $\text{Similarity}_{total}$ in Equation (3). Masking_region of Equation (2) refers to a masking region as in FIGS. 10 and 11, which is an uncovered face portion segmented from the current input face, and Face_area refers to a whole face area detected by face segmentation on a registered image that has no covered portion.

When the input face is uncovered, Masking_region and Face_area have nearly similar area sizes, so a value of Masking_region/Face_area approximates '1' and $\text{Weight}_2$ has a value close to 0. This means that a measurement is very close to the similarity S1 when a face in the input image has almost no covered portion. This may be expressed as in the following Equation (4):

$$Similaritytotal = S_1 * 1.0 + S_2 * 0.0 = S_1 \tag{4}$$

When the input face is covered by a mystic object as much as about 80%, a weight may be as in the following Equation (5):

$$\text{Weight}_2 = 1.0 - (\text{Masking\_region}/\text{Face\_area} = 0.2) = 0.8 \tag{5}$$

In this case, as $\text{Weight}_2$ has a high value of 0.8 and $\text{Weight}_1$ has a low value of 0.2, combination is made by taking the similarity value of 80% or higher in the uncovered face portion that is actually present and taking the similarity value of only about 20% in the whole face area, thereby having more robust recognition performance. The combination similarity may be as in the following Equation (6):

$$\text{Similarity} = S_1 * 0.2 + S_2 * 0.8 \tag{6}$$

However, the method proposed in the present disclosure may have a downside as compared to the traditional facial recognition method in that registered face images as well as feature vectors of the registered face images need to be stored and that an amount of calculation increases because applying masking regions to all the registered face images and extracting new features are added when an uncovered face is input while the traditional method does not have a large amount of calculation even when there are many registered images because the traditional method measures the similarity distance by using pre-calculated feature vectors. To solve this, i.e., to reduce an amount of calculation, a method of expecting various covering of the registered images to extract feature vectors that are suitable to the respective covering in various manners may be used.

Figure 15:
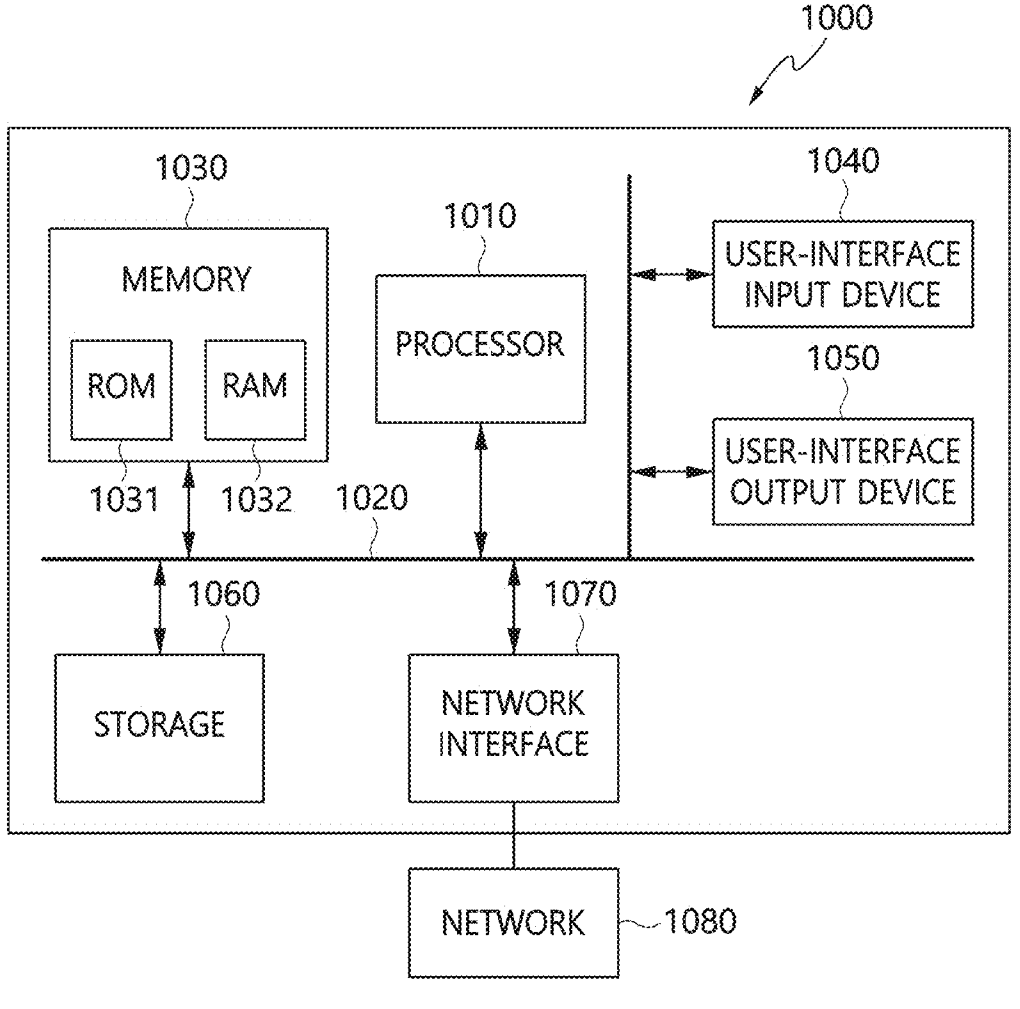
FIG. 15 is a diagram illustrating a configuration of a computer system, according to an embodiment of the present disclosure.

FIG. 15 is a diagram illustrating a configuration of a computer system, according to an embodiment of the present disclosure.

In the embodiment of the present disclosure, the facial recognition apparatus based on masking may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. The processor 1010 may be a central processing unit (CPU) or a semiconductor device that executes a program or processing instructions stored in the memory 1030 or the storage 1060. Each of the memory 1030 and the storage 1060 may include at least one of a volatile medium, a nonvolatile medium, a removable medium, a non-removable medium, a communication medium, or an information transfer medium. For example, the memory 1030 may include Read-Only Memory (ROM) 1031 or random-access memory (RAM) 1032.

According to an embodiment of the present disclosure, a facial recognition apparatus based on masking includes the memory 1030 configured to store at least one program, and the processor 1010 configured to execute the program, and the program includes instructions to perform the step of performing detection and normalization of a face area including five landmarks in an input image, the step of separating a face portion other than a portion covered by an obstacle in the detected face area, the step of generating a mask corresponding to the separated face portion when there is a portion covered by an obstacle in the separated face portion, the step of applying the mask to an image in a face image registration database and extracting a feature of a masking region, and the step of determining whether it is a same person based on the extracted feature value.

The step of generating the mask corresponding to the separated face portion may include the step of determining that there is a covered portion when the face landmark point is not present in the separated face portion or when an area size of a detected face element is smaller than a preset size.

The face landmark points may include center positions of both eyes, a center position of nose, and both corner positions of mouth.

The step of determining whether it is the same person based on the extracted feature value may include determining whether it is the same person by using the feature value of the masking region and a feature value of an original registered image.

The step of determining whether it is the same person based on the extracted feature value may include calculating a weighted sum of the feature value of the masking region and the feature value of the original registered image based on a proportion of the portion covered by the obstacle in a whole face.

The face image registration database may include a face image and a feature value corresponding to the face image.

The program may be configured to determine whether it is an identical person by comparing a feature value extracted from an image in the face image registration database with a feature value extracted from the input image when there is no portion covered by an obstacle in the separated face portion.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

According to the present disclosure, a robust facial recognition method may be provided even in a case that a face is covered by an obstacle.

According to the present disclosure, reliability of facial recognition may increase by enabling similarity comparison with the use of a detected face portion other than a covered portion.

According to the present disclosure, as a feature is extracted only in an uncovered masking region except for a hair area, recognition performance is robust to a change in hair style.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A facial recognition method based on masking comprising:

performing detection and normalization of a face area including face landmarks in an input image;

separating a face portion other than a portion covered by an obstacle in the detected face area by performing face segmentation that separates an uncovered face portion;

generating a mask corresponding to the separated uncovered face portion;

applying the mask to a registered face image in a face image registration database;

extracting a first set of features from a whole face area of both the input image and the registered face image, and extracting a second set of features from a masking region corresponding to the uncovered face portion of both the input image and the registered face image; and determining whether the input image and the registered face image represent an identical person by calculating a total similarity based on a combination of a first similarity derived from the first set of features and a second similarity derived from the second set of features, wherein the first similarity and the second similarity are combined using weights determined by a ratio of the masking region to the whole face area.

2. The facial recognition method of claim 1, wherein generating the mask corresponding to the separated face portion comprises:

determining that there is a covered portion when the face landmarks are not present in the separated face portion or when a size of a detected face element is smaller than a preset size.

3. The facial recognition method of claim 2, wherein the face landmarks include center positions of both eyes, a center position of nose, and both corner positions of mouth.

4. The facial recognition method of claim 1, wherein, among the weights determined by the ratio of the masking region to the whole face area, a weight applied to the second similarity increases as the ratio of the masking region to the whole face area decreases.

5. The facial recognition method of claim 1, wherein the weights comprise a first weight applied to the first similarity and a second weight applied to the second similarity, and wherein a sum of the first weight and the second weight is one.

6. The facial recognition method of claim 1, wherein the face image registration database stores both the registered face image and a pre-calculated feature vector corresponding to the whole face area of the registered face image.

7. The facial recognition method of claim 1, further comprising:

determining whether the input image and the registered face image represent based solely on the first similarity when there is no portion covered by an obstacle in the separated face portion.

8. A facial recognition apparatus based on masking comprising:

a memory configured to store one or more instructions; and a processor configured to execute, the one or more instructions to:

perform detection and normalization of a face area including face landmarks in an input image;

separates a face portion other than a portion covered by an obstacle in the normalized face area by performing face segmentation that separates an uncovered face portion;

generate a mask corresponding to the separated uncovered face portion;

applying the mask to a registered face image in a face image registration database;

extract a first set of features from a whole face area of both the input image and the registered face image, and extracting a second set of features from a masking region corresponding to the uncovered face portion of both the input image and the registered face image; and determine whether the input image and the registered face image represent is an identical person by calculating a total similarity based on a combination of a first similarity derived from the first set of features and a second similarity derived from the second set of features, wherein the first similarity and the second similarity are combined using weights determined by a ratio of the masking region to the whole face area.

9. The facial recognition apparatus of claim 8, wherein the processor is further configured to execute the one or more instructions to:

determine that there is a covered portion when the face landmarks are not present in the separated face portion or when a size of a detected face element is smaller than a preset size.

10. The facial recognition apparatus of claim 9, wherein the face landmarks include center positions of both eyes, a center position of nose, and both corner positions of mouth.

11. The facial recognition apparatus of claim 8, wherein, among the weights determined by the ratio of the masking region to the whole face area, a weight applied to the second similarity increases as the ratio of the masking region to the whole face area decreases.

12. The facial recognition apparatus of claim 8, wherein the weights comprise a first weight applied to the first similarity and a second weight applied to the second similarity, and wherein a sum of the first weight and the second weight is one.

13. The facial recognition apparatus of claim 8, wherein the face image registration database stores both the registered face image and a pre-calculated feature vector corresponding to the whole face area of the registered face image.

14. The facial recognition apparatus of claim 8, wherein the program is configured to determine whether the input image and the registered face image represent based solely on the first similarity when there is no portion covered by an obstacle in the separated face portion.

* * * * *